2. Sheets.

2 Sheets--Sheet 1.

G. W. COTTINGHAM.

Ironing Apparatus.

No. 6,654.

Reissued Sept. 21, 1875.

WITNESSES:

P. G. Dieterich

Wm. Kupferman.

INVENTOR:

Gideon W. Cottingham per C. H. Watson & Co

ATTORNEYS.

G. W. COTTINGHAM.

Ironing Apparatus.

No. 6,654.

Reissued Sept. 21, 1875.

WITNESSES:

P. C. Dieterich

Wm. Blickenderfer.

INVENTOR:

Gideon W. Cottingham per C. H. Watson & Co

ATTORNEYS.

38. TEXTILES, IRONING OR SMOOTHING.
SUBSTITUTED FOR MISSING COPY.

UNITED STATES PATENT OFFICE.

GIDEON W. COTTINGHAM, OF ROCKPORT, TEXAS, ASSIGNOR, BY MESNE ASSIGNMENTS, TO THE COTTINGHAM IRONING-MACHINE COMPANY.

IMPROVEMENT IN IRONING APPARATUS.

Specification forming part of Letters Patent No. 144,743, dated November 18, 1873; reissue No. 6,654, dated September 21, 1875; application filed August 19, 1875.

*To all whom it may concern:*

Be it known that I, GIDEON W. COTTINGHAM, of Rockport, in the county of Aransas and State of Texas, have invented certain new and useful Improvements in Ironing-Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to ironing-machines, having for its object to furnish a machine which shall be simple in construction, convenient and efficient in operation, and durable in use; and it consists in the construction and novel arrangement of the horizontally-moving iron and horizontally-reciprocating table; in the devices whereby one person can operate the table and govern the iron; in the construction of the reciprocating table, with the devices for operating the same; and in the devices which govern the iron, as hereinafter more fully described.

Figure 1:
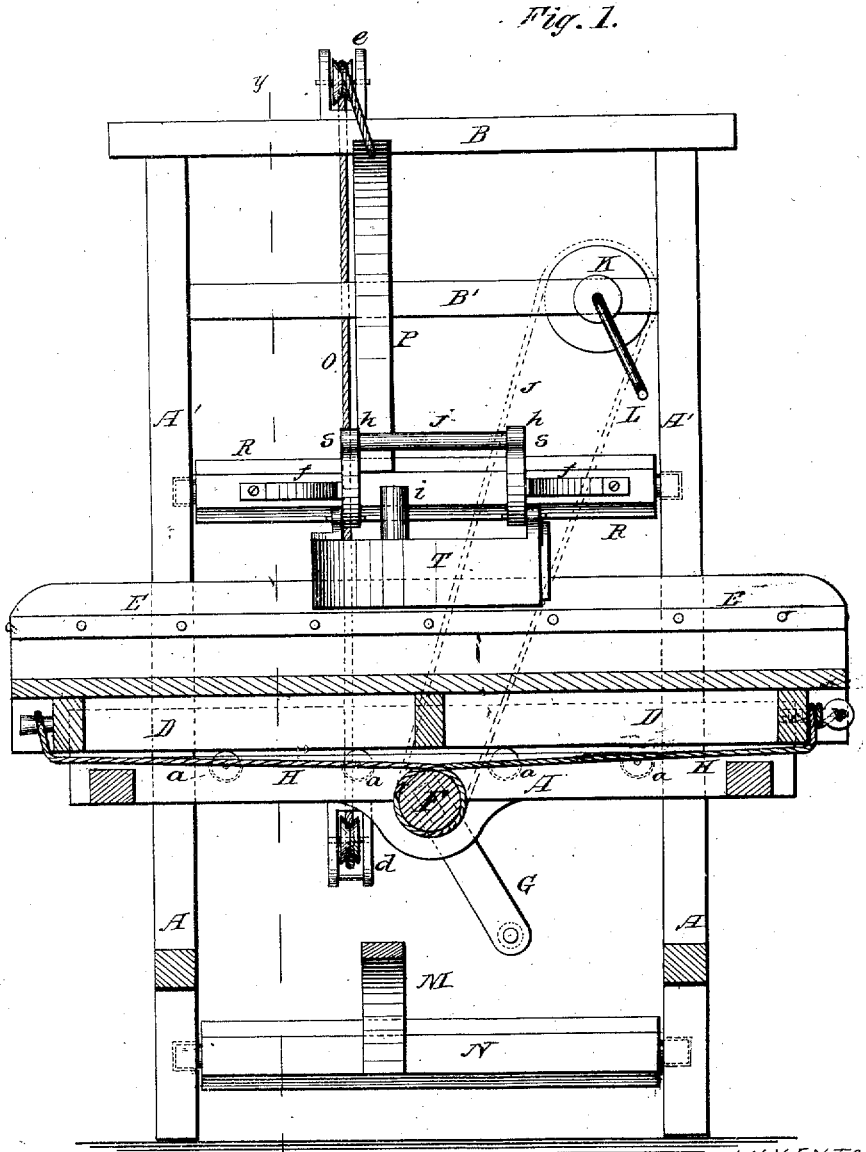
Figure 2:
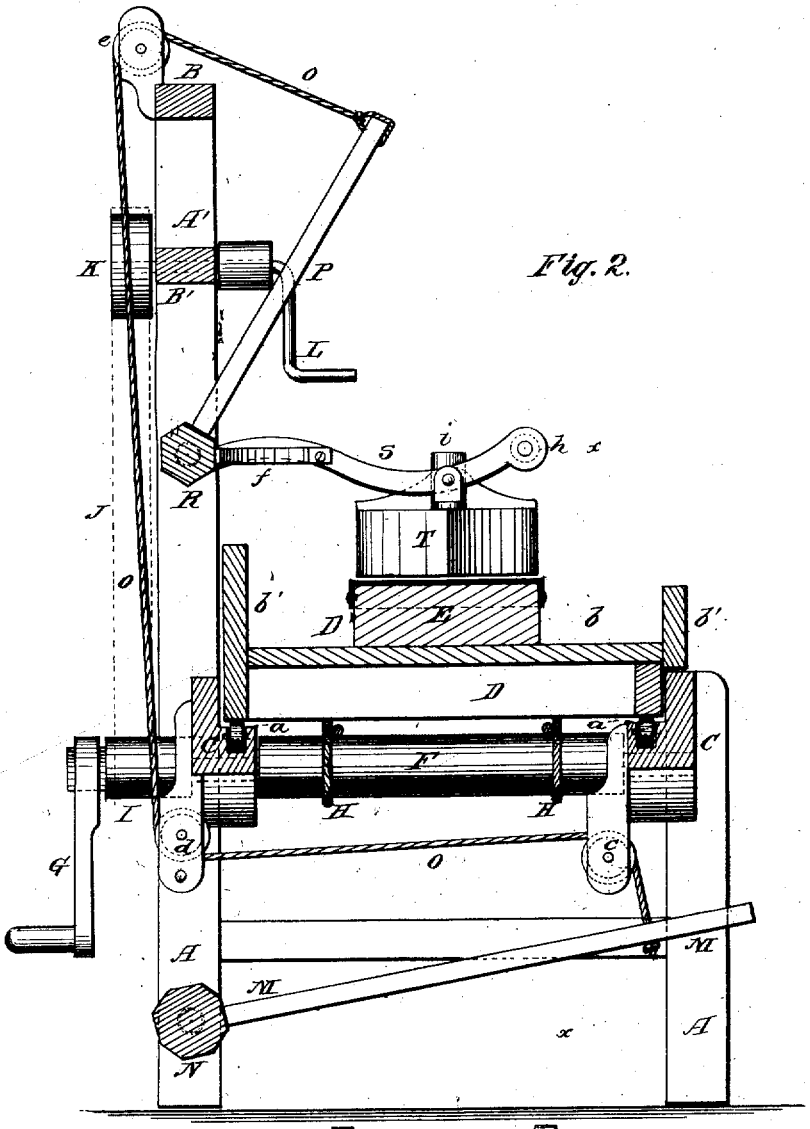
Figure 3:
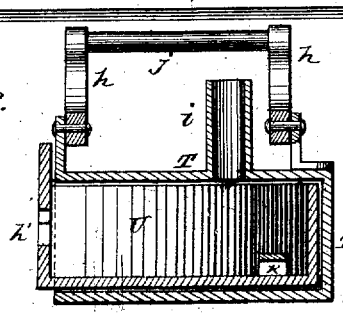

In the annexed drawing, Figure 1 is a longitudinal vertical section of a machine embodying my invention. Fig. 2 is a transverse vertical section of the same through the line *y y*, Fig. 1. Fig. 3 is a sectional view of the iron.

A represents the frame supporting the machine, having two uprights, A′ A′, at the rear part thereof, and provided with cross-bars B B′. C represents two guides, secured to the frame A, and provided with friction-rollers *a a*. These rollers support the table, and allow the same to be easily moved back and forth, while the guides serve to keep the table in proper position. The table D consists of the base *b*, the front and rear vertical parts *b′ b′*, and the elevated part or board E, the latter being the ironing-surface, which is padded in the usual manner. F represents a roller, placed transversely beneath the table, and suitably journaled in the frame. H represents cords passing once around the roller F, the ends being fastened to each end of the table. At the rear of the machine the end of the roller is provided with a crank, G, and also a pulley, I, which connects with the pulley or band-wheel K by the band or belt J. The wheel K is upon a shaft which passes through the cross-bar B′, the end of said shaft being formed into a crank, L, extending out toward the front of the machine. M represents a treadle, secured to the rock-shaft N, which has bearings in the frame. Near the front end of the treadle the cord O is secured, said cord passing over pulley *c*, under pulley *d*, and over pulley *e*, and secured to the lever P, which is attached to the rock-shaft R, having bearings in the uprights A′ A′. S represents a curved arm, which is attached to the rock-shaft R, and extending outward to the front of the machine, and provided with a handle, *h*. The said arm S has braces *f f* extending from the arm to the rock-shaft R. T represents the iron, being open at the rear, and provided with chimney *i* and handle *j*. This iron is provided with a pan, U, having an opening, *h′*, in the rear, and a lip, *k*, near the front part, for convenience in moving the same from the iron when hot. The iron is suspended over the table D, being connected to the arm S.

In operating the invention, one person stands at the rear at the crank G, which, through the medium of the roller F and cords H, moves the table back and forth, as desired, and another person stands at the front for operating the treadle and iron; or one person may operate the machine from the front by the crank L, which connects with the roller F through the medium of the wheel K, band J, and pulley I. The iron, when full size, weighs sixty pounds, and will always, when left free, have that amount of pressure upon the table. If less pressure is required, the operator places one foot upon the treadle, which is connected to the iron, and presses down, by which means the pressure of the iron is regulated to any degree less than the weight of the iron. If a greater pressure be required, it is only necessary to press down upon the handle *h*.

The vertical parts *b′ b′* of the table are for the purpose of keeping the garments being ironed from falling over the table, and coming in contact with the other parts of the machine.

Having thus fully described my invention, what I claim as new, and desire to secure by Letters Patent, is—

1. The vertically-moving iron, in combination with a horizontally-reciprocating table, and mechanism to operate both the iron and table, as and for the purpose herein specified.

2. In an ironing-machine, the vertically-moving iron and horizontally-reciprocating table, and the crank L, arranged on the front, whereby one person can operate the table and govern the iron, substantially as and for the purpose described.

3. The table D, having base *b*, vertical parts *b′ b′*, and elevated portion E, substantially as and for the purposes herein set forth.

4. The horizontally-reciprocating table D, in combination with the rollers *a*, rollers F, and cords H H, substantially as and for the purposes herein set forth.

5. The table D, having base *b*, vertical parts *b′ b′*, and elevated portion E, in combination with the guides C C and rollers *a a*, substantially as and for the purpose specified.

6. The curved arm S, having handle *h* and braces *f f*, in combination with the pivoted iron T, rock-shaft R, and uprights B B, all constructed and arranged for operation, as and for the purpose specified.

7. In combination with the iron T, the arm S, rock-shaft R, lever P, cord O, and treadle M, all constructed for operation as and for the purpose specified.

In testimony that I claim the foregoing I have hereunto set my hand this 16th day of August, 1875.

GIDEON W. COTTINGHAM.

Witnesses:

H. A. HALL,

WM. B. UPPERMAN.